(12) United States Patent
Akada

(10) Patent No.: US 7,450,153 B2
(45) Date of Patent: Nov. 11, 2008

(54) IMAGE-BLUR CORRECTION APPARATUS, LENS APPARATUS AND OPTICAL DEVICE

(75) Inventor: Hiroshi Akada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 11/053,283

(22) Filed: Feb. 8, 2005

(65) Prior Publication Data

US 2005/0174465 A1 Aug. 11, 2005

(30) Foreign Application Priority Data

Feb. 10, 2004 (JP) ............................. 2004-033280

(51) Int. Cl.
*G02B 13/16* (2006.01)
*H04N 5/225* (2006.01)
*G02B 27/64* (2006.01)

(52) U.S. Cl. ..................... 348/208.11; 348/208.12; 348/357; 348/374

(58) Field of Classification Search ............... 348/335; 359/554, 555, 556, 557
See application file for complete search history.

(56) References Cited

U.S. PATENT DOCUMENTS

| | | | | |
|---|---|---|---|---|
| 6,052,240 A | * | 4/2000 | Ikari | ............................ 359/819 |
| 6,587,270 B2 | * | 7/2003 | Terada | ........................ 359/554 |
| 6,606,456 B2 | | 8/2003 | Fujinaga | ....................... 396/55 |
| 6,718,131 B2 | * | 4/2004 | Okazaki et al. | ................ 396/55 |
| 2002/0018296 A1 | * | 2/2002 | Kashiwaba et al. | .......... 359/554 |
| 2002/0159769 A1 | * | 10/2002 | Fujinaga | ...................... 396/55 |

FOREIGN PATENT DOCUMENTS

| | | |
|---|---|---|
| JP | 11-212133 | 9/1999 |
| JP | 2002-182259 | 6/2002 |
| JP | 2002-350916 | 12/2002 |

* cited by examiner

*Primary Examiner*—Ngoc-Yen Vu
*Assistant Examiner*—Christopher K Peterson
(74) *Attorney, Agent, or Firm*—Morgan & Finnegan, L.L.P.

(57) ABSTRACT

An image blur correction apparatus which can be reduced in size is disclosed. The image blur correction apparatus has a base member which is moved in a direction of an optical axis with respect to a member extended in the direction of the optical axis and a lens hold member which is moved in a plane substantially orthogonal to the optical axis with respect to the base member. The base member has a concave portion on a periphery thereof through which the member extended in the direction of the optical axis passes and is provided with a support shaft closer to the optical axis than the concave portion, the support shaft supporting the lens hold member and the lens hold member has an engaging portion which engages with the support shaft to allow a movement of the lens hold member in the plane substantially orthogonal to the optical axis.

9 Claims, 8 Drawing Sheets

IMAGE-BLUR CORRECTION APPARATUS, LENS APPARATUS AND OPTICAL DEVICE

BACKGROUND OF THE INVENTION

1. Field of the Invention

The present invention relates to an image blur correction apparatus which optically corrects image blur caused by vibrations.

2. Description of Related Art

A conventional image blur correction apparatus (a first conventional example) described in Japanese Patent Laid-Open No. 2002-350916 (corresponding to U.S. Pat. No. 6,606,456) has a support shaft formed on part of the periphery of a base member and a support frame (a movement member) having a long hole portion into which the support shaft is fit, wherein the base member, the support shaft, and the support frame are relatively moved on a plane substantially orthogonal to an optical axis. On the base member, two coils are disposed at positions substantially orthogonal to each other around the optical axis, and permanent magnets and yokes are disposed on the support frame opposite to the coils to constitute a magnetic circuit which serves as a drive source for the aforementioned relative movement.

Japanese Patent Laid-Open No. H11(1999)-212133 (a second conventional example, corresponding to U.S. Patent Application Publication No. 2002/0018296) has proposed an image blur correction apparatus which has a support shaft fixed to a support frame (a movement member) of the image blur correction apparatus and a base member having a long hole portion (a support shaft engaging portion) into which the support shaft is fit, wherein the support frame, the support shaft, and the base member are relatively moved on a plane substantially orthogonal to an optical axis. Similarly to the aforementioned first conventional example, coils, permanent magnets, and yokes are disposed individually to constitute a magnetic circuit serving as a drive source for the relative movement. In addition, the image blue correction apparatus has a concave portion in the periphery thereof for receiving a portion of another optical member such as a barrel extending in the optical axis direction.

Japanese Patent Laid-Open No. 2002-182259 (a third conventional example) has proposed an image blur correction apparatus which involves a relative movement on a plane substantially orthogonal to an optical axis, similarly to the aforementioned second conventional example. In the image blur correction apparatus, two coils are fixed to a support frame and disposed at positions substantially orthogonal to each other around the optical axis, and a first yoke, a pair of permanent magnets attracted to the first yoke, a second yoke, and a pair of permanent magnets attracted to the second yoke are attached to a base member opposite to the coils, thereby constituting magnetic circuit which serves as a drive source for the relative movement. The second yoke is disposed to abut on the end face of a protruding piece extending in the optical axis direction from near a long hole portion.

In the first conventional example which has the support shaft formed in the periphery of the base member, when a portion of another component of an optical device, on which the image blur correction apparatus is mounted, is disposed to cross the image blur correction apparatus in the optical axis direction, a lens barrel should be formed such that that component extends outside the periphery of the base member. This leads to an increased outer diameter of the lens barrel to cause an increase in size of the optical device.

When the image blur correction apparatus has the concave portion formed in the periphery thereof for receiving the portion of the other member extending in the optical axis direction as in the second conventional example, the long hole portion needs to be formed in the base member in accordance with the movement amount of the support frame for image blur correction, and the permanent magnets and the coils should be disposed to avoid the long hole portion, so that the space efficiency is reduced to result in an increased size of the lens barrel.

When the second yoke is disposed to abut on the end face of the protruding piece extending in the optical axis direction from near the long hole portion as in the third conventional example, the long hole portion in the base member may be pressed and deformed by magnetic attraction which acts between the second yoke and the permanent magnets. Thus, sliding friction between the support shaft and the long hole portion may be increased to reduce the drive property.

SUMMARY OF THE INVENTION

It is an object of the present invention to provide a small image blur correction apparatus having an excellent image blur correction capability, lens apparatus and an optical device which has the image blur correction apparatus.

According to one aspect, the present invention provides an image blur correction apparatus which has a base member which is moved in a direction of an optical axis with respect to a member extended in the direction of the optical axis and a lens hold member which is moved in a plane substantially orthogonal to the optical axis with respect to the base member. The base member has a concave portion on a periphery thereof through which the member extended in the direction of the optical axis passes and is provided with a support shaft closer to the optical axis than the concave portion, the support shaft supporting the lens hold member, and the lens hold member has an engaging portion which engages with the support shaft to allow a movement of the lens hold member in the plane substantially orthogonal to the optical axis.

These and other characteristics of the image blur correction apparatus of the present invention will be apparent from the following description of a specific embodiment with reference to the drawings.

DETAILED DESCRIPTION OF THE PREFERRED EMBODIMENT

A preferred embodiment of the present invention is hereinafter described with reference to the drawings.

Embodiment 1

Figure 5:
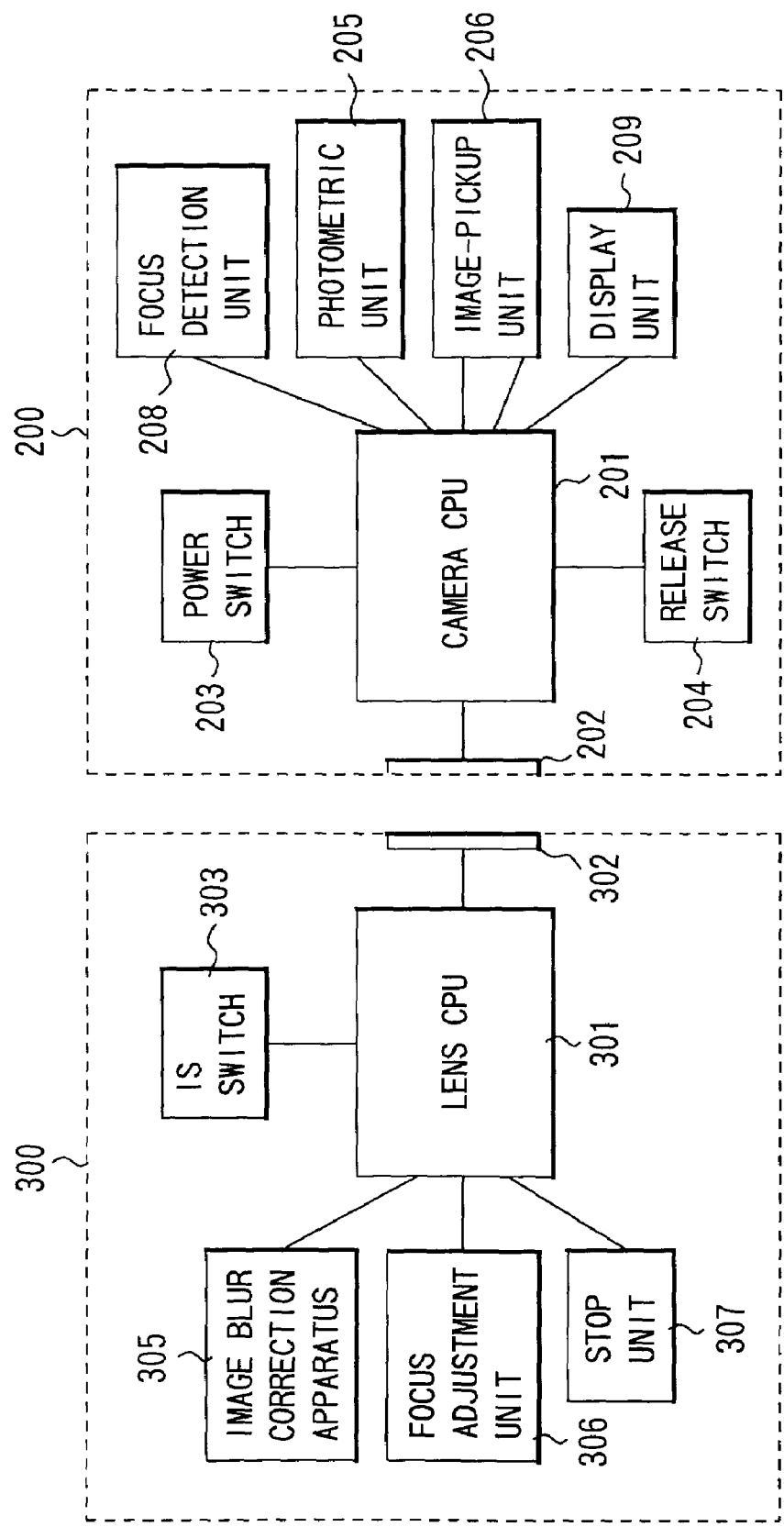
FIG. 5 is a block diagram of a camera system (including a lens system) in Embodiment 1 according to the present invention.

Description is first made for the structure of a lens system and a camera system equipped with an image blur correction apparatus of Embodiment 1. FIG. 5 is a block diagram showing the structure of the camera system (including the lens system) equipped with the image blur correction apparatus.

Reference numeral 200 shows a camera body, and reference numeral 300 shows a lens body. Reference numeral 201 shows a camera CPU which is realized by a microcomputer. The camera CPU 201 controls unit operation of various components and circuits and the like in the camera body 200, later described, and performs communication with a lens CPU 301 through the connection between a lens contact 302 and a camera contact 202 when the lens body 300 is mounted. Reference numeral 203 is a power switch which is operable externally and used to start the camera CPU 201 to enable the power supply to actuators, sensors and the like in the system and the operation of the system. Reference numeral 204 shows a two-stroke release switch which is operable externally. A signal from the release switch 204 is input to the camera CPU 201.

Reference numeral 205 shows a photometric unit which performs photometric measurements, 206 an image-pickup unit which has an image-pickup element such as a CCD sensor and CMOS sensor. Reference numeral 208 shows a focus detection unit, and 209 a display unit which displays various image-taking conditions such as a stop value and a shutter speed, the number of taken images, remaining battery life, and various modes, in response to a command from the camera CPU 201.

In response to a signal input from the release switch 204, the camera CPU 201 performs control. When a first-stroke switch is turned on (a SW1 signal is generated), the photometric unit 205 starts photometric measurements, and the result of in-focus calculation for an object by the focus detection unit 208 is relied on to perform focusing operation with a focus lens drive instruction to a focus adjustment unit 306, later described, in-focus determination and the like, thereby entering a state in which the camera system is ready for image-taking.

Upon detection of turn-on of a second-stroke switch (generation of a SW2 signal), the camera CPU 201 transmits a drive instruction for a stop unit in the lens body 300, later described, to the lens CPU 301 (which controls unit operation of various components and circuits in the lens body 300, later described, and performs communication with the camera CPU 201 through the connection between the lens contact 302 and the camera contact 202 when the lens body 300 is mounted on the camera body 200) in the lens body 300 to drive the stop unit 307.

Thereafter, the camera CPU 201 transmits an exposure start instruction to the image-pickup unit 206 to perform actual exposure operation (forming an image on the image-pickup element and outputting an electric signal produced from the image-forming), receives an exposure end signal, acquires an electric signal of a taken image from the image-pickup unit 206 having the image-pickup element such as a CCD or CMOS, and performs display on the display unit 209 and image processing.

Reference numeral 303 shows an image blur correction selection switch which is operable externally (hereinafter referred to as an IS switch). The IS switch 303 allows a user to select whether or not image blur correction operation (hereinafter referred to as IS operation), later described, is performed (the IS operation is selected by turning the IS switch ON).

Reference numeral 305 shows an image blur correction apparatus which is broadly divided into the following six components. A first one is an image blur correction optical system which consists of an image blur correction lens 14 and a lens hold member 5 which holds the image blur correction lens 14. A second one is a drive mechanism for driving the image blur correction optical system. A third one is a position detection mechanism for detecting the position of the moved image blur correction optical system. A fourth one is a lock mechanism which allows the image blur correction optical system to be locked at a predetermined position (the optical axis center position) or unlocked. A fifth one is a lock drive mechanism for driving the lock mechanism. A sixth one is a vibration detection mechanism which detects the acceleration or speed of vertical vibrations or horizontal vibrations of a camera to detect the vibration state which is subjected to image blur correction.

Reference numeral 306 shows a focus adjustment unit which is formed of a focus lens and the lens hold member therefor, a focus lens drive mechanism for driving the focus lens to a target position, a transmission mechanism which transmits drive force from the focus lens drive mechanism as movement force for the focus lens, and a focus lens drive circuit which is controlled by the lens CPU 301 in accordance with information about an movement amount of the focus lens based on the in-focus calculation result from the focus detection unit 208 transmitted from the camera CPU 201 and sends a drive command to the focus lens drive mechanism.

Reference numeral 307 shows the stop unit which is formed of a stop mechanism which sets an aperture area, a stop mechanism drive unit for driving the stop mechanism, and a stop drive circuit which is controlled by the lens CPU 301 in accordance with a stop operation instruction transmitted from the camera CPU 201 and sends a drive command to the stop mechanism drive unit.

Figure 6:
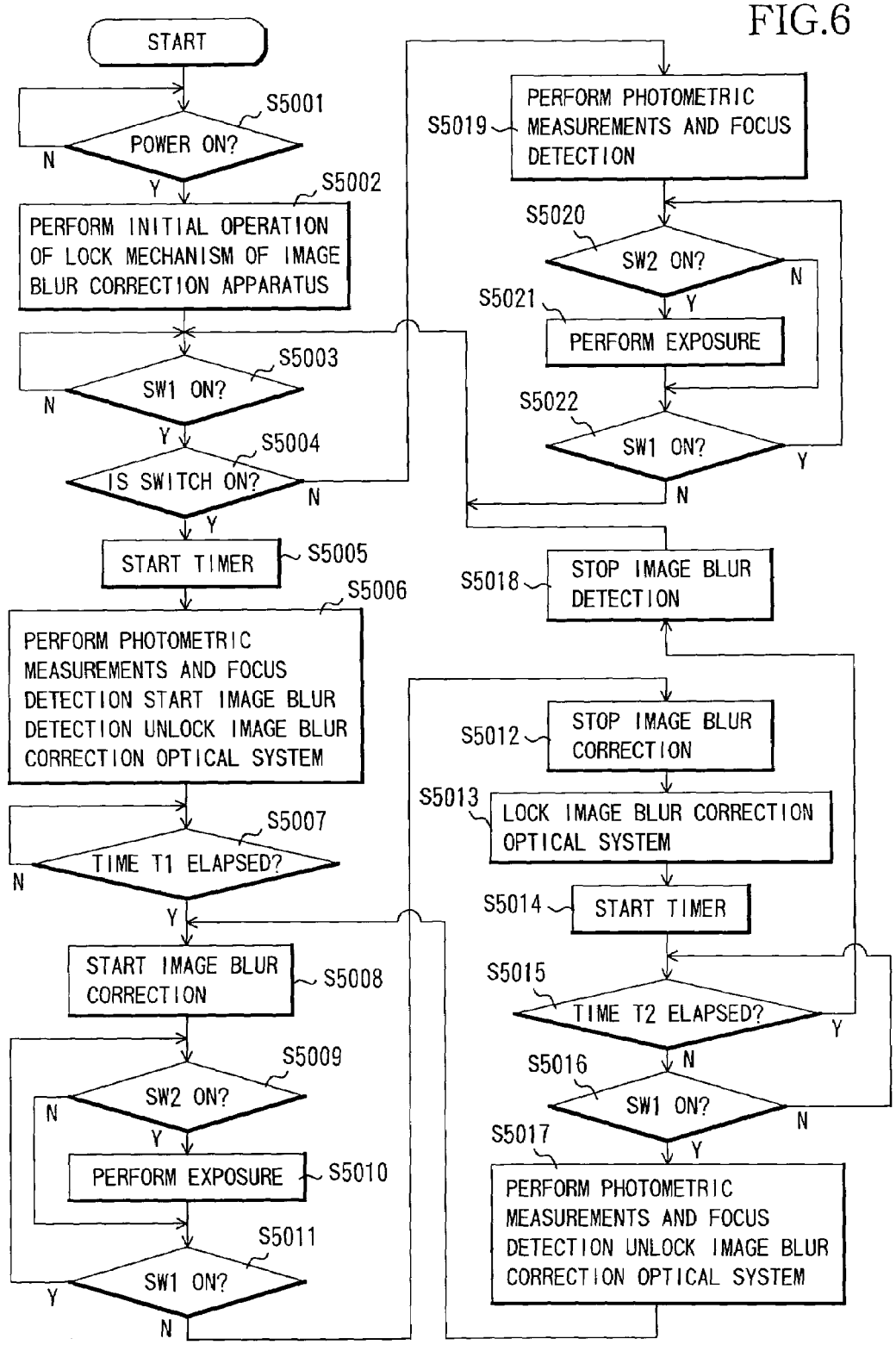
FIG. 6 is a flow chart showing operation of the camera system (including the lens system) in Embodiment 1 according to the present invention.

FIG. 6 is a flow chart showing main operation in the lens system and the camera system shown in FIG. 5.

First, it is determined that the power switch 203 of the camera body 200 is turned on and the supply of power to the lens body 300 is started (or the communication between the camera body 200 and the lens body 300 is started when a new battery is put or when the lens body 300 is mounted on the camera body 200) (S5001). Then, the lens CPU 301 energizes the image blur correction apparatus 305 to perform initial operation of the image blur correction apparatus 305 (S5002).

In brief, the initial operation is processing for setting a lock member 10 (a member for locking the lens hold member 5 of the image blur correction system) serving as the lock mechanism of the image blur correction apparatus 305 to a predetermined reference position. Whenever the power is turned on, the lock mechanism is driven to set the lock member 10 to the predetermined reference position in case an interruption of the power or a shock shifts the position of the lock member 10 during the driving of the lock mechanism to prevent the determination of the current lock state from the predetermined reference position.

For example, when a stepping motor (a pulse drive motor) is used as the drive source of the lock drive mechanism, the image blur correction optical system is moved to a target position by controlling the number of drive pulses from the predetermined reference position to the target position. If the predetermined reference position (the number of pulses the current position is shifted from the reference position) is uncertain, the exact number of pulses to the target position cannot be calculated. Thus, the operation of ensuring the predetermined reference position is required first.

Next, the camera CPU 201 determines whether or not the SW1 signal is generated at the release switch 204 (S5003). If it is generated, the CPU 301 determines whether or not the IS switch 303 is turned on (the IS operation is selected) (S5004). If the IS operation is selected, the process proceeds to step S5005, or to step S5019 if not.

At step S5005, the lens CPU 301 performs to start an internal timer. Then, the camera CPU 201 operates the photometric unit 205 and the focus detection unit 208 to perform photometric measurements and focus detection, respectively. The lens CPU 301 operates the focus adjustment unit 306 to perform focusing operation, operates the image blur correction apparatus 305 to start detecting image blur, and operates the lock drive mechanism to unlock the image blur correction optical system (S5006).

Next, the lens CPU 301 determines whether or not the aforementioned timer has counted to a predetermined time t1. If the time t1 is not reached, the lens CPU 301 waits at step S5007 until the time t1 is reached (S5007). This is processing for waiting until an output signal from the vibration detection mechanism is stabilized.

After the predetermined time t1 has elapsed, the image blur correction optical system is driven by the drive mechanism of the image blur correction apparatus 305 to start image blur correction control based on a target value signal calculated with the output signal from the vibration detection mechanism and an output signal from the position detection mechanism (S5008).

Next, the camera CPU 201 determines whether or not the SW2 signal is generated at the release switch 204 (S5009). If it is not generated, it determines again whether or not the SW1 signal is generated (S5011). If the SW1 signal is not generated, the lens CPU 301 stops the image blur correction control (S5012). Then, the lens CPU 301 drives the lock mechanism to lock the image blur correction optical system to a predetermined position (the optical axis center position) (S5013).

If it is determined that the SW2 signal is not generated at step S5009 but the SW1 signal is generated at step S5011, the process returns to step S5009. When it is determined that the SW2 signal is generated at the release switch 204 at step S5009, the lens CPU 301 controls the stop unit 307, and simultaneously, the camera CPU 201 performs control to make exposure operation on the image-pickup element of the image-pickup unit 206 (S5010).

Next, the camera CPU 201 determines the state of the SW1 signal (S5011). If the SW1 signal is not generated, the lens CPU 301 stops the image blur correction control (S5012). The lens CPU 301 drives the lock drive mechanism to lock the image blur correction optical system to the predetermined position (the optical axis center position) (S5013).

When the operation described above is completed, the lens CPU 301 once resets the aforementioned timer and again starts it (S5014), and again determines whether or not the SW1 signal is generated within a predetermined time t2. If the SW1 signal is generated within the predetermined time t2 after the image blur correction is stopped, the photometric measurements, focus detection operation, focus adjustment operation, and unlock of the image blur correction optical system are performed (S5017). Since the image blur detection operation is continuously performed, the image blur correction optical system is immediately driven to start the image blur correction control again based on a target value signal and an output signal from the position detection mechanism (S5008).

Then, operation similar to the abovementioned one is repeated. The determination whether the predetermined time t2 has elapsed or not can eliminate the disadvantage that a user has to start the vibration detection mechanism and wait until the output thereof is stabilized each time the user stops the release operation and then again performs release operation.

On the other hand, if the SW1 signal is not generated within the predetermined time t2 after the image blur correction is stopped (S5015), the image blur detection is stopped (the operation of the vibration detection mechanism is stopped) (S5018). The process then returns to step S5003 to enter the state for waiting for the generation of the SW1 signal.

If the IS operation is not selected at step S5004 described above, the camera CPU 201 performs photometric measurements and focus detection operation, and the lens CPU 301 performs focusing adjustment operation (S5019). The camera CPU 201 determines whether the SW2 signal is generated at the release switch 204 (S5020). If it is not generated, it again determines whether or not the SW1 signal is generated (S5022). If the SW1 signal is not generated, the process returns to step S5003 to enter the state for waiting for the generation of the SW1 signal.

When the SW2 signal is not generated but the SW1 signal is generated at step S5022, the process returns to step S5020. When the generation of the SW2 signal at the release switch 204 is detected at step S5020, the lens CPU 301 controls the stop unit 307, and simultaneously, the camera CPU 201 controls the focus detection unit 208 to perform exposure operation on the image-pickup elements of the image-pickup unit 206 (S5021). Next, the camera CPU 201 determines the state of the SW1 signal (S5022), and if the SW1 signal is not generated, the process returns to step S5003 from step S5022.

In the camera system of Embodiment 1, the abovementioned series of operation is repeated until the power switch 203 is turned off. When the power is turned off, the communication between the camera CPU 201 and the lens CPU 301 is ended, and the power supply to the lens body 300 is also ended.

Figure 1A:
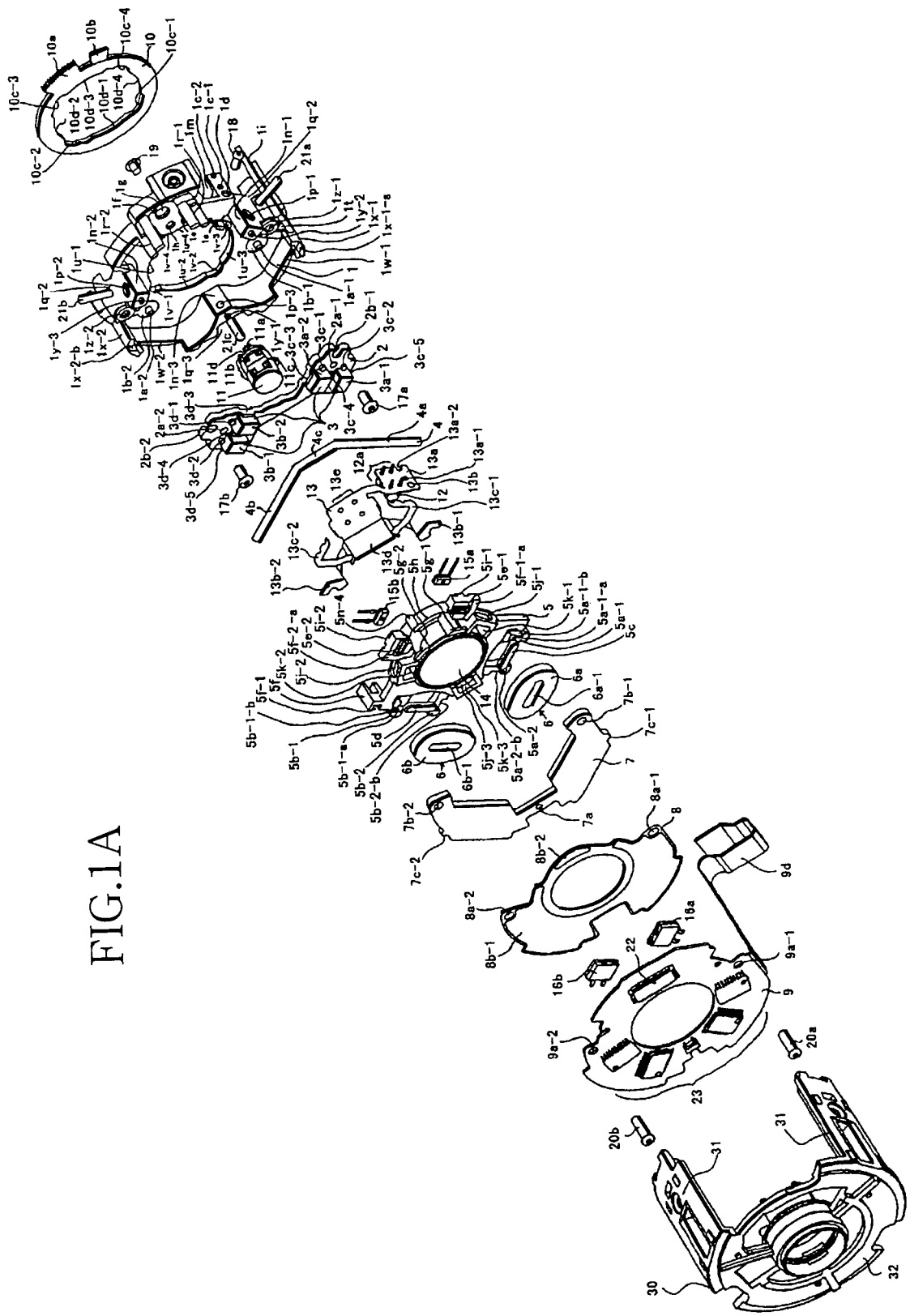
FIG. 1A is a perspective exploded view of an image blur correction apparatus in Embodiment 1 according to the present invention.
Figure 1B:
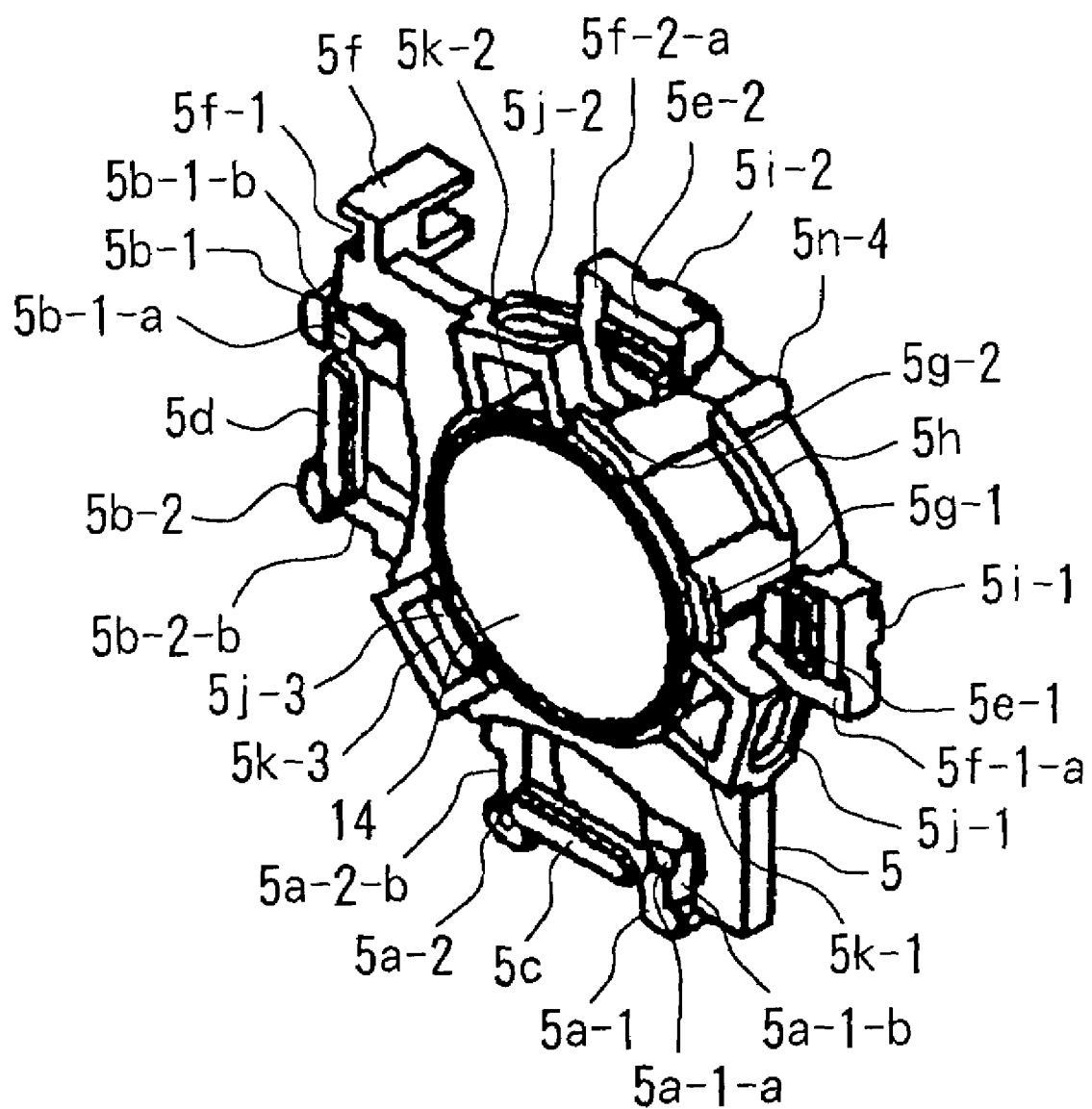
FIG. 1B is a perspective enlarged view showing a lens hold member of the image blur correction apparatus in Embodiment 1 according to the present invention.
Figure 1C:
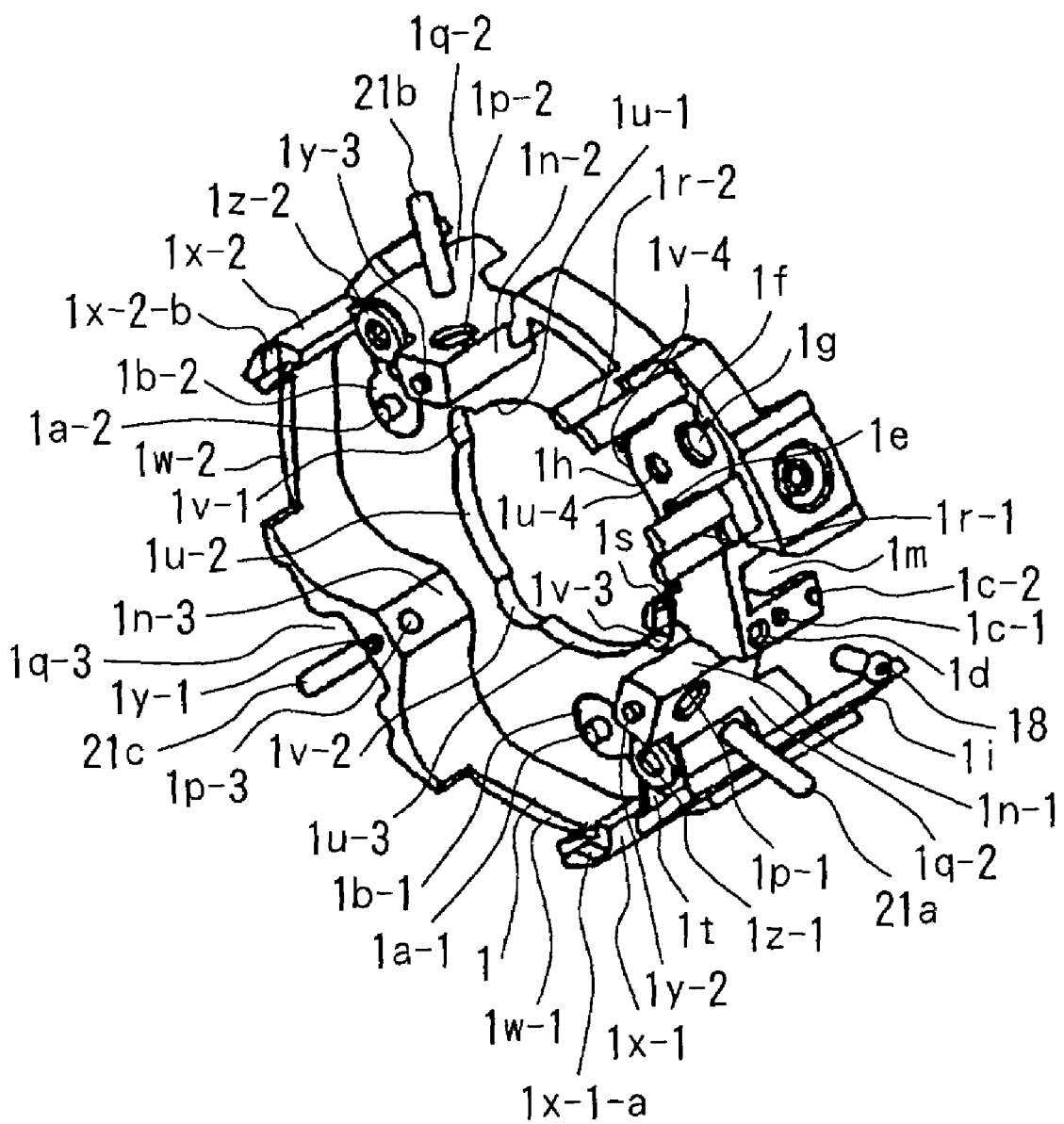
FIG. 1C is a perspective enlarged view showing a base member of the image blur correction apparatus in Embodiment 1 according to the present invention.
Figure 2:
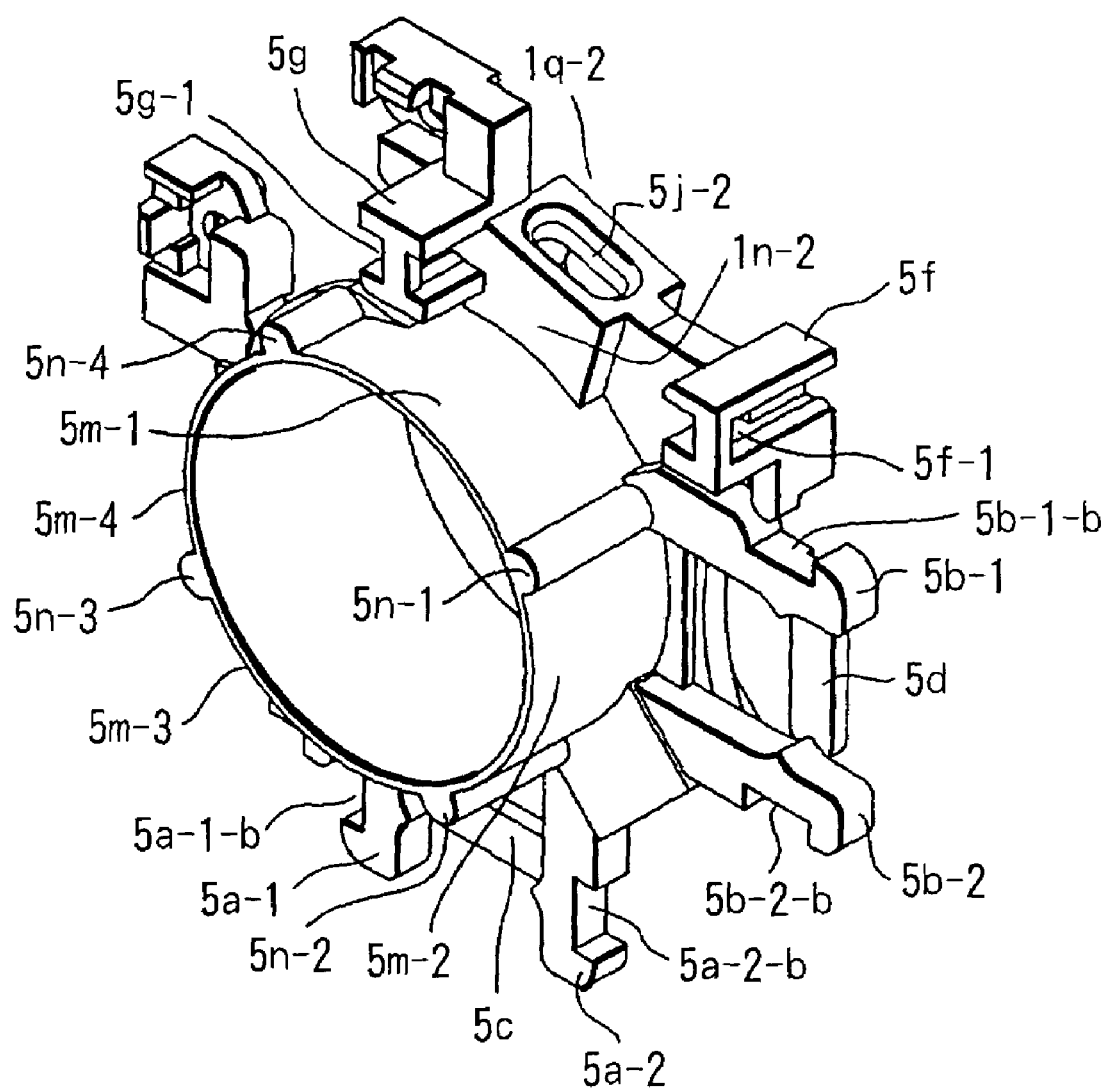
FIG. 2 is another perspective view showing the lens hold member of the image blur correction apparatus in Embodiment 1 according to the present invention.
Figure 3:
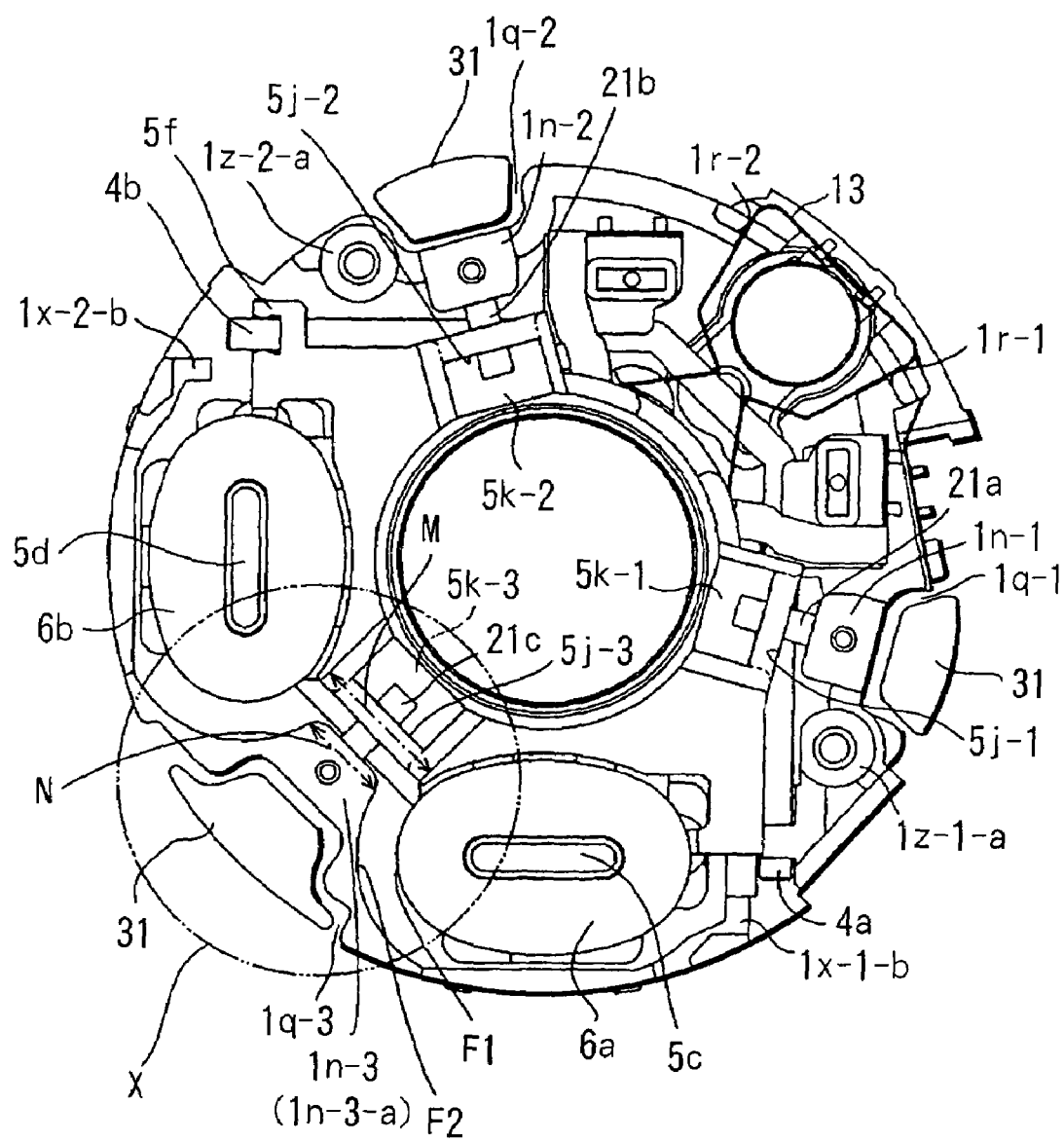
FIG. 3 is a front view showing the image blur correction apparatus during assembly in Embodiment 1 according to the present invention.

Next, the mechanical structure of the image blur correction apparatus of Embodiment 1 is described with reference to FIGS. 1A to 3. FIG. 1A is a perspective exploded view of the image blur correction apparatus of the present invention. FIG. 1B is a perspective view of the lens hold member 5. FIG. 1C is a perspective view of a base member (FIGS. 1B and 1C are perspective enlarged views showing the lens holding member 5 and the base member in FIG. 1A). FIG. 2 is another perspective view of the lens hold member 5. FIG. 3 is a front view showing the image blur correction apparatus during assembly.

Reference numeral 1 shows the base member made of synthetic resin, and 2 shows a first yoke member made of steel plate with high permeability. Reference numeral 3 shows a permanent magnet which is formed of a pair of permanent magnets 3*a*-1, 3*a*-2 and permanent magnets 3*b*-1, 3*b*-2, each formed in rectangular shape.

Reference numeral 4 shows a guide shaft which is formed by bending a metal rod and has a first guide portion 4*a* and a second guide portion 4*b*. A bend portion 4*c* is formed between the first guide portion 4*a* and the second guide portion 4*b*.

Reference numeral 5 shows the lens hold member which is made of synthetic resin and holds an image blur correction lens 14.

Reference numeral 6 shows a coil which is made of wire and is formed of a first coil 6a for driving the lens hold member 5 in a first orthogonal direction which is orthogonal to an optical axis and a second coil 6b for driving the lens hold member 5 in a second orthogonal direction which is orthogonal to the optical axis and the first orthogonal direction.

Reference numeral 7 shows a second yoke member made of steel plate with high permeability, reference numeral 8 shows an insulating plate made of synthetic resin with high electrical insulation, and reference numeral 9 shows an image blur correction system electrical circuit board on which electrics of an image blur correction control circuit are mainly mounted.

Reference numeral 10 shows a lock ring which is made of synthetic resin and mechanically locks the movement of the lens hold member 5 in the direction of correction operation, reference numeral 11 shows a motor for driving the lock ring 10, reference numeral 12 shows a position detection element such as a photointerrupter for the lock ring 10, reference numeral 13 shows a flexible printed circuit board, reference numerals 15a, 15b show light emitting elements, reference numerals 16a, 16b show light receiving elements, reference numerals 17 to 20 show fastening members, reference numerals 21a to 21c show support shafts which made of metal rod, and reference numeral 22 show a connecting member such as a connector for electrically connecting the flexible printed circuit board 13 to the electrical circuit board 9.

Reference numeral 30 shows a lens hold frame (a barrel) as another component (a les apparatus) in a lens barrel on which the image blur correction apparatus is mounted. The lens hold frame 30 has an extending portion (a bar) 31 which extends forward and backward in an optical axis direction and a lens attachment portion 32 to which a lens, not shown, is attached.

The base member 1 has concave portions 1q-1 to 1q-3 formed in the periphery thereof for providing space through which the extending portion 31 of the lens hold frame 30 extends forward and backward in the optical axis direction, the base member is moved relatively to the lens hold frame 30 (in other words, to the bar member 31) in the optical axis direction. The base member 1 also has shaft arrangement portions 1n-1 to 1n-3 provided at substantially the same angular positions (the positions in the circumferential direction) as the concave portions 1q-1 to 1q-3 and closer to the optical axis than the concave portions 1q-1 to 1q-3.

The lens hold member 5 has engaging portions 5j-1 to 5j-3 formed in long hole shape into which the support shafts 21a to 21c are fit, respectively, to allow a movement of the lens hold member 5 in a plane substantially orthogonal to the optical axis. The support shafts 21a to 21c provided for the shaft arrangement portions 1n-1 to 1n-3 are fit into the engaging portions 5j-1 to 5-3 to support the lens hold member 5 to the base member 1.

Next, the details of the components and their relationships are described.

First, the permanent magnet 3 is placed on the first yoke member 2. In the placement, the permanent magnet 3 is positioned such that the permanent magnets 3a-1, 3a-2 are attracted by magnetic attraction in a range in which their movements are prevented by protrusions 3c-1 to 3c-7 (protrusions 3c-6, 3c-7 are not shown but are disposed opposite to protrusions 3c-1, 3c-2) formed on the first yoke member 2, and the permanent magnets 3b-1, 3b-2 are attracted by magnetic attraction in a range in which their movements are prevented by protrusions 3d-1 to 3d-7 (protrusions 3d-6, 3d-7 are not shown but are disposed opposite to protrusions 3d-1, 3d-2) formed on the first yoke member 2.

Next, the first yoke member 2 is attached to the base member 1. In the attachment, protrusive shaft portions 1a-1, 1a-2 formed on the base member 1 are fit into hole portions 2a-1, 2a-2 formed in the first yoke member 2, respectively. The end face of the first yoke member 2 is abutted on abutment portions 1b-1, 1b-2 formed on the base member 1. Fastening members 17a, 17b are inserted into groove portions 2b-1, 2b-2 of the first yoke member 2 and engaged in hole portions (not shown) of the base member 1. In this manner, the first yoke member 2 is fixed to the base member 1.

Next, the coil 6 is attached to the lens hold member 5. In this attachment, the end surfaces of the coils 6a, 6b abut on coil fixing piece portions 5a-1 and 5a-2, 5b-1 and 5b-2 formed on the lens hold member 5, respectively, to position the coils 6a, 6b in the optical axis direction. In addition, protrusive portions 5c, 5d of the lens hold member 5 having chamfered edges are fit into long hole portions 6a-1, 6b-1 formed in the coils 6a, 6b, respectively, to position the coils 6a, 6b in the direction perpendicular to the optical axis.

After the coil 6 is attached to the lens hold member 5, an adhesive is applied to groove portions 5a-1-b, 5a-2-b, 5b-1-b, 5b-2-b formed in the coil fixing piece portions 5a-1, 5a-2, 5b-1, 5b-2 to bond and fix the lens hold member 5 to the coils 6a, 6b. Groove portions 5a-1-a, 5b-1-a are provided for passing coil wire.

Next, the light emitting elements 15a, 15b are attached to the lens hold member 5 through thermal caulking or the like. Protrusive portions 5i-1, 5i-2 are subjected to thermal caulking to fix terminal portions of the light emitting elements 15a, 15b to the lens hold member 5. Long hole portions 5e-1, 5e-2 are formed in the lens hold member 5. The light emitting elements 15a, 15b are arranged such that light rays emitted therefrom can pass through the long hole portions 5e-1, 5e-2.

Then, the flexible printed circuit board 13 is attached to the lens hold member 5. An adhesive material such as a double-faced tape provided for the end face of the flexible printed circuit board 13 is adhered and bonded to the side of the lens hold member 5. At this point, terminal portions of the coils 6a, 6b are connected to end portions 13b-1, 13b-2 through soldering or the like, and the terminal portions of the light emitting element 15a, 15b are connected to end portions 13c-1, 13c-2 through soldering or the like. A terminal portion 12a of the detection element 12 such as a photointerrupter is inserted into a hole portion formed in an end portion 13a, and soldering or the like is performed, thereby attaching the detection element 12 to the end portion 13a.

Reference numerals 5g-1, 5g-2, and 5h show light shielding pieces for shielding light such that light rays incident from an object are not leaked from a crack in a lens barrel when the lens barrel is moved in the direction orthogonal to the optical axis. The light shielding pieces 5g-1, 5g-2 also serve as guide portions for arrangement of the flexible printed circuit board 13. Grooves 5f-1-a, 5f-2-a are also guide grooves for arrangement of the flexible printed circuit board 13.

Next, the long-side shaft portion 4b serving as the second guide portion of the guide shaft 4 engages with engaging groove portions 5f-1, 5g-1 of engaging pillar portions 5f, 5g provided for the lens hold member 5 (the pillar portion 5g and the groove portion 5g-1 are shown in FIG. 2).

Next, a hole portion 11c and a groove portion 11d of the motor 11 receive protrusive portions 1e, 1f of the base member 1 for positioning. A pinion portion 11a is inserted into a hole portion 1g. A fastening member 19 is inserted into a hole portion 1h. In this manner, the motor 11 is fixed to the base member 1.

Then, the engaging portions 5*j*-1 to 5*j*-3 formed in the lens hold member 5 are aligned with respect to hole portions 1*p*-1 to 1*p*-3 formed in shaft arrangement portions 1*n*-1 to 1*n*-3 of the base member 1. The support shafts 21*a* to 21*c* are inserted into the hole portions 1*p*-1 to 1*p*-3 of the shaft arrangement portions 1*n*-1 to 1*n*-3 of the base member 1 and the engaging portions 5*j*-1 to 5*j*-3 of the lens hold member 5, respectively, to fix them through press-fit, bonding or the like. At this point, the long-side shaft portion 4*a* serving as the first guide portion of the guide shaft 4 engages with groove portions is, it of the base member 1. The flexible printed circuit board 13 is placed in slit portions 1*r*-1, 1*r*-2 of the base member 1. A terminal portion 11*b* of the motor 11 is inserted into a hole portion 13*e* of the flexible printed circuit board 13, and the terminal portion 11*b* is soldered for fixing.

Peripheral side portions 5*m*-1 to 5*m*-4 of the lens hold member 5 abut on inner surface portions 1*u*-1 to 1*u*-4 of the base member 1 to prevent the movement of the lens hold member 5 with respect to the base member 1 in the direction orthogonal to the optical axis. Groove portions 1*v*-1 to 1*v*-4 of the base member 1 are clearance portions for engaging convex portions 5*n*-1 to 5*n*-4 formed on the lens hold member 5. Groove portions 1*w*-1, 1*w*-2 formed in the base member 1 are clearance portions for preventing interference during the movement of the coil 6 in the direction orthogonal to the optical axis.

Next, the lock ring 10 is fit to the base member 1. In the fitting, the lock ring 10 is held by the base member 1 such that it is prevented from moving in the optical axis direction and rotated about the optical axis. A gear portion 10*a* of the lock ring 10 engages with the pinion portion 11*a* of the motor 11, and the lock ring 10 is rotated by the driving of the motor 11. A light shielding plate portion 10*b* is formed at a position to engage with the position detection element 12 to allow electrical detection of the lock state and unlock state of the lens hold member 5.

The lock ring 10 has groove portions 10*c*-1 to 10*c*-4 formed in its inner diameter portion to receive the engaging convex portions 5*n*-1 to 5*n*-4 of the lens hold member 5 to enable mechanical setting of the lock state and unlock state (the lock state is set when the engaging convex portions 5*n*-1 to 5*n*-4 are prevented from moving by the groove portions 10*d*-1 to 10*d*-4 of the lock ring 10, while the unlock state is set when the positions of the engaging convex portions 5*n*-1 to 5*n*-4 match the positions of the groove portions 10*c*-1 to 10*c*-4).

Next, protrusive shaft portions 1*c*-1, 1*c*-2 formed on the base member 1 are fit into a hole portion 13*a*-1 and a groove portion 13*a*-2 of the end portion 13*a* of the flexible printed circuit board 13. A fastening member 18 is inserted into a hole portion 13*b* of the flexible printed circuit board 13 and is engaged with a hole portion 1*d* of the base member 1. Thus, the flexible printed circuit board 13 is fixed to the base member 1. At this point, the position detection element 12 is put in a hole potion 1*m* of the base member 1 (FIG. 3 shows the aforementioned parts assembled). The lens hold member 5 has hole portions 5*k*-1 to 5*k*-3 formed therein for checking whether or not the support shafts 21*a* to 21*c* are set at predetermined positions.

As described above, in Embodiment 1, since the concave portions 1*q*-1 to 1*q*-3 are formed near the shaft arrangement portions 1*n*-1 to 1*n*-3 (on the side of the shaft arrangement portions 1*n*-1 to 1*n*-3 closer to the outer diameter) for the support shaft 21*a* to 21*c* of the base member 1, the space for passing part on the lens hold frame 30 (the extending portion 31) in the lens barrel is ensured. Thus, the extending portion 31 of the lens hold frame 30 can be arranged to be put inside the outer diameter of the image blur correction apparatus, so that the outer diameter of the lens barrel can be reduced accordingly. Since the lens hold member 5 which is the moving member is not moved with the support shafts 21*a* to 21*c*, the weight of the movable section (including the lens hold member 5) can be reduced and thus power saving can be achieved.

Next, the end face of the second yoke member 7 is abutted on and attached to an end face portion 1*n*-3-*a* of the shaft arrangement portion 1*n*-3, end face portions 1*x*-1-*b*, 1*x*-2-*b* of portions 1*x*-1, 1*x*-2, and end face portions 1*z*-1-*a*, 1*z*-2-*a* formed on the base member 1 shown in FIG. 3. In the attachment, a protrusive shaft portion 1*y*-1 is fit into a hole portion 7*a*, and end face portions 7*c*-1, 7*c*-2 abut on end face portions 1*x*-1-*a*, 1*x*-2-*b*, respectively. Consequently, the second yoke member 7 is positioning with respect to the base member 1.

The second yoke member 7 is attached to the base member 1 to form a magnetic circuit constituted by the first yoke member 2, the permanent magnet 3, the coil 6, and the second yoke member 7. Then, the coil 6 is energized to provide thrust for moving the lens hold member 5 in the direction orthogonal to the optical axis.

The second yoke member 7 is pressed against and abuts on the end face portion 1*n*-3-*a* which is the top face of the shaft arrangement portion 1*n*-3, the end face portions 1*x*-1-*b* and 1*x*-2-*b* by the magnetic attraction of the permanent magnet 3. As compared with the third conventional example in which the base member 1 has the engaging potions 5*j*-1 to 5*j*-3 and the yoke abuts on the top face thereof, the engaging portions 5*j*-1 to 5*j*-3 are not formed in the base member 1 but in the lens hold member 5 in the structure of Embodiment 1, so that it is possible to repress deformation of the engaging portions due to press force. Specifically, sliding friction force between the engaging portions 5*j*-1 to 5*j*-3 and the support shafts 21*a* to 21*c* due to deformation is reduced to maintain the stable engagement between the support shafts and the engaging portions.

Thus, an excellent image bur correction capability can be maintained. The lens hold member 5 can be supported favorably by the engaging portions 5*j*-1 to 5*j*-3 and the support shafts 21*a* to 21*c* to provide a satisfactory correction capability.

Then, the light receiving elements 16*a*, 16*b* receive light rays emitted from the light emitting elements 15*a*, 15*b*, and the correction system electric circuit, later described, performs signal processing thereon to detect the position of the lens hold member 5, thereby making it possible to realize drive control for image blur correction.

The sheet member 8 is applied to the image blur correction system electric circuit board 9 with adhesive portions 8*b*-1, 8*b*-2. The sheet member 8 is provided for shielding unnecessary light rays. The image blur correction system electric circuit board 9 has the light receiving elements 16*a*, 16*b* such as PSDs, the connection member 22, and other signal processing circuit parts 23 mounted thereon.

The image blur correction system electric circuit board 9 is attached to the base member 1. In the attachment, fastening members 20*a*, 20*b* are inserted into hole portions 9*a*-1, 9*a*-2 formed in the image blur correction system electric circuit board 9, hole portions 8*a*-1, 8*a*-2 formed in the sheet member 8, and hole portions 7*b*-1, 7*b*-2 formed in the second yoke member 7, respectively, to engage with hole portions 1*z*-1, 1*z*-2 formed in the base member 1 to fasten and fix the respective components.

A connection portion 13*d* of the flexible printed circuit board 13 is connected to the connection member 22 to bring the image blur correction system electric circuit board 9, the coil 6, the light emitting element 15, and the position detection element 12 into electrical conduction. The end face of a flexible printed circuit board portion 9d of the image blur correction system electric circuit board 9 is attached to an attachment surface portion 1i of the base member 1 with a double-faced tape or the like. The end portion of the flexible printed circuit board portion 9d is connected to a body electric circuit board of the lens barrel (a circuit board on which the lens CPU is mounted). In this manner, electrical conduction to the body electric circuit board is established.

Next, description is made for the optimal arrangement space of the concave portion 1q-3 and the shaft arrangement portion 1n-3 formed in the base member 1 and the engaging portion 5j-3 formed in the lens hold member 5.

Figure 4:
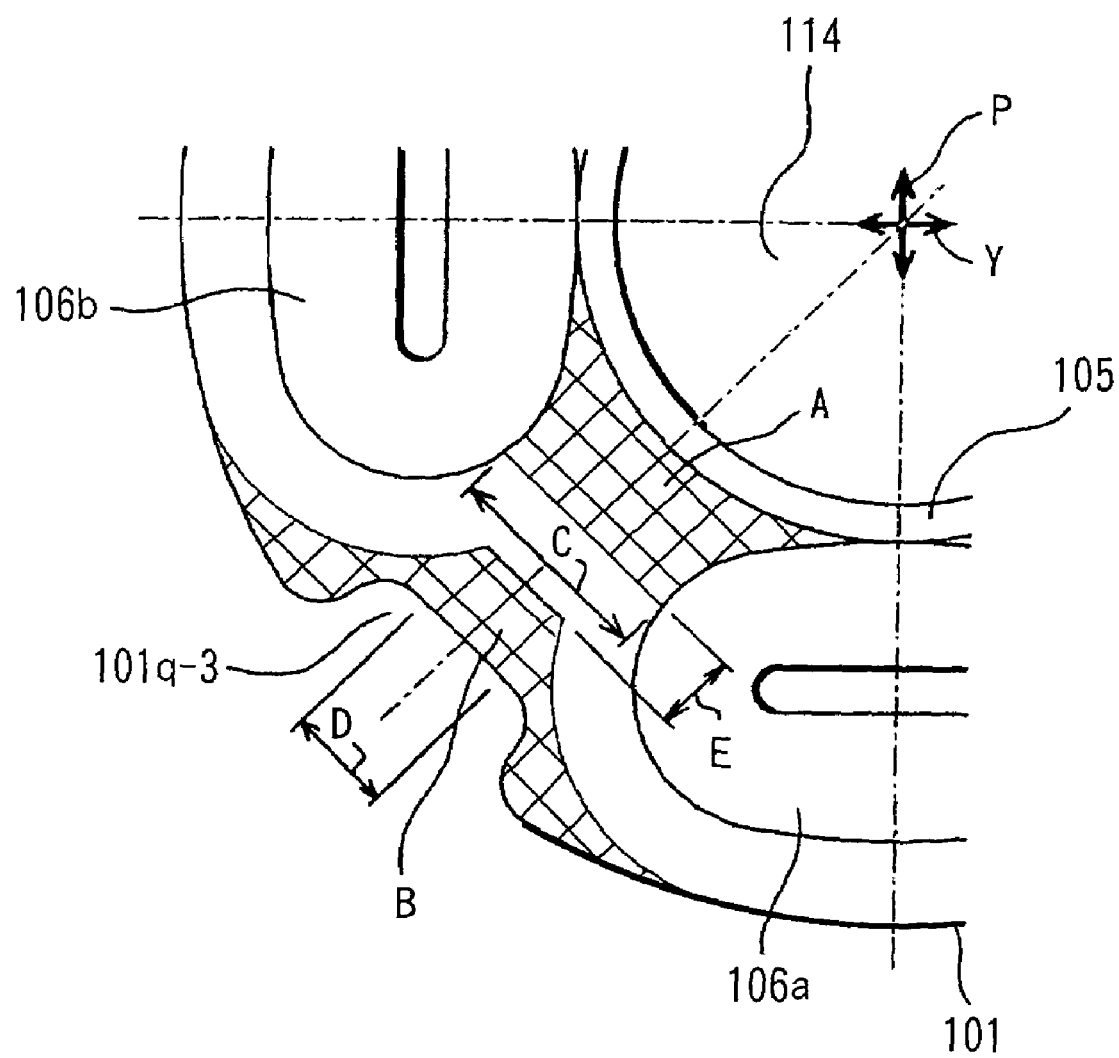
FIG. 4 is a schematic diagram showing arrangement space of components of the image blur correction apparatus in Embodiment 1 according to the present invention.

FIG. 4 is a schematic diagram showing the optimal arrangement space of the shaft arrangement portion 1n-3 for the support shaft 21c and the engaging portion 5j-3 which receives the support shaft 21c in view of the shape of a base member 101 and the arrangement of a lens hold member 105 and coils 106a, 106b (a schematic diagram covering an area X in FIG. 3).

In FIG. 4, reference numeral 101 shows the base member, reference numeral 105 shows the lens hold member, reference numerals 106a, 106b show the coils attached to the lens hold member 105, and reference numeral 114 shows an image blur correction lens.

The base member 101 has a concave portion 101q-3 formed between the coils 106a, 106b. The concave portion 101q-3 is provided for receiving part of the lens hold frame 30 (the extending portion 31) as described above to reduce the outer diameter of the whole lens barrel. A plurality of the extending portions (the bar member) 31 of the lens hold frame 30 are provided at substantially equal intervals around the optical axis. The plurality of the extending portions 31 (typically three or four) are disposed at substantially equal intervals in order to reduce the influence of an inclination of the held lens.

At least one of the extending portions 31 preferably passes through the concave portion 101q-3 formed between the two coils 106a, 106b. This is because the space convenient to form the concave portion 101q-3 is provided between the two coils since the two coils 106a, 106b are spaced individually in consideration of the function and the structure of the magnetic circuit and both ends of the coils have arc shape (convex shape).

A hatched area A shows an area for placing the engaging portion 5j-3 of the lens hold member 105. A hatched area B shows an area for providing the shaft arrangement portion 1n-3 for the support shaft 21c. The area A and the area B are the space provided between the coil 106a (the first coil) and the coil 106b (the second coil) fixed to the lens hold member 105. The space has the same size even when the lens hold member 105 is moved in association with the image blur correction (in a direction P (the first orthogonal direction) and a direction Y (the second orthogonal direction) in FIG. 4).

The area B is space assigned to the base member 101 and provided at a distance from the coils 106a, 106b equal to a predetermined maximum movement amount (the maximum movement amount in the directions P, Y in FIG. 4) of the coils 106a, 106b due to relative movement thereof. When the area A is compared with the area B, the area A has a width C larger than a width D of the area B. Thus, the engaging portion requiring a relatively large width dimension is formed in the area A, while the shaft arrangement portion 1n-3 for the support shaft 21c requiring a relatively small width dimension is formed in the area B. Specifically, the width (a width M in FIG. 3) of the engaging portion 5j-3 closer to the shaft arrangement portion 1n-3 can be formed to be larger than the width (a width N in FIG. 3) of the end portion of the shaft arrangement portion 1n-3 closer to the engaging portion 5j-3 (M>N) in the plane orthogonal to the optical axis. Even with the concave portion 101q-3 provided on the periphery of the base member 101, the shaft arrangement portion 1n-3 for the support shaft 21c and the engaging portion 5j-3 can be efficiently placed, and at the same time, it is possible to sufficiently ensure the space of the coils 106a, 106b and the movement amount of the coils 106a, 106b for image blur correction.

For example, if the engaging portion 5j-3 is formed in the area B in contrast to Embodiment 1, it is necessary to ensure the space for forming the engaging portion 5j-3 by reducing the sizes of the coils 106a, 106b, reducing the movement amount required for image blur correction (in the direction P (the first orthogonal direction) and the direction Y (the second orthogonal direction) in FIG. 4), eliminating the concave engaging portion 101q-3, or increasing the outer diameter of the base member 101. This makes it difficult to provide a satisfactory image blur correction capability or increases the size of the image blur correction apparatus or the whole lens barrel.

With the aforementioned structure, however, the components can be efficiently arranged in the limited space to provide the image blur correction apparatus with an excellent image blur correction capability and the small lens barrel.

A distance E between the area A and the area B is set to be substantially equal to the predetermined maximum movement amount of the coils 106a, 106b (in the direction P (the first orthogonal direction) and the direction Y (the second orthogonal direction) in FIG. 4).

It is desirable that the distance between the engaging portion 5j-3 and the shaft arrangement portion 1n-3 for the support shaft 21c is as small as possible. When variations in part accuracy of the shaft arrangement portion 1n-3 cause an inclination of the support shaft 21c after fixing, such an inclination may have a greater influence on the engaging portion 5j-3 to degrade optical performance as the distance from the shaft arrangement portion 1n-3 for the support shaft 21 is larger.

As shown in FIG. 3, a portion F1 of the coil 6a closer to the shaft arrangement portion 1n-3 has a convex shape, and a surface F2 of the shaft arrangement portion 1n-3 closer to the coil 6a is formed in concave shape recessed from the convex portion F1 of the coil 6a which is moved closer to the surface F2. Thus, the movement amount of the coil necessary for image blur correction (or the correction lens 14 shown in FIG. 1) can be ensured sufficiently.

As described above, according to Embodiment 1, even when the concave portions 1q-1 to 1q-3 are formed on the periphery of the base member 1, the support mechanism of the lens hold member 5 (the shaft arrangement portion 1n-3, the engaging portion 5j-3, the support shaft 21c and the like) can be arranged efficiently while the space of the drive portion for image blur correction and the movement amount of the lens hold member 5 are ensured sufficiently. It is thus possible to provide the image blur correction apparatus with a small size and an excellent image blur correction capability.

More specifically, since the coil 6 is more lightweight than the permanent magnet 3 (magnet) typically in the image blur correction apparatus, the weight of the whole lens hold member 5 is reduced in a moving-coil type (the coil is attached to the movable lens hold member 5 and the permanent magnet 3 is attached to the base member 1) than in a moving-magnet type (the permanent magnet 3 is attached to the lens hold member 5 and the coil 6 is attached to the base member 1). This is advantageous in providing favorable drive characteristics (image blur correction characteristics) of the lens hold member 5 (the image blur correction lens 14).

In general, however, the coil 6 is larger than the permanent magnet 3 (magnet). When the coil 6 is attached to the lens hold member 5, the space for disposing the movable support mechanism of the lens hold member 5 in the area between the two coils 6a and the coil 6b is especially reduced if an attempt is made to sufficiently ensure the movable range of the lens hold member 5 and avoid the interference between the coil 6 and the movable support mechanism at the same time.

On the other hand, when the lens hold frame 30 and other components are disposed backward and forward the image blur correction apparatus within the lens barrel and they are coupled through the member (the extending portion 31) extending in the optical axis direction on the periphery of the image blur correction apparatus (base member 1), an increase in the diameter of the lens barrel should be prevented by forming the concave portion 1q-3 on the periphery of the base member 1 and passing the extending portion 31 within the concave portion 1q-3.

However, if the movable support mechanism is provided for the image blur correction apparatus of the moving-coil type at the same angular position as the concave portion 1q-3, the space for disposing the movable support mechanism in the area between the two coils 6a and the coil 6b is limited by the large coils 6a, 6b attached to the lens hold member 5, and is also significantly narrowed by providing the concave portion 1q-3. It is difficult to form the engaging portion 5j-3 (the long hole portion) in the base member 1 to receive the support shaft 21c of the movable support mechanism in such a situation.

To address this, in Embodiment 1, the support shaft 21c is fixed to the shaft arrangement portion 1n-3 formed at the same angular position (the position in the circumferential direction) as the concave portion 1q-3 in the base member 1 and closer to the optical axis than the concave portion 1q-3, and the engaging portion 5j-3 (the long hole portion) which receives the support shaft 21c is formed in the lens hold member 5, thereby solving the aforementioned problem for the first time. Since the support shafts 21a to 21c, which are often made of metal, are not provided for the lens hold member 5, the weight of the lens hold member 5 can be reduced accordingly to improve the image blur correction characteristics.

Therefore, according to Embodiment 1, it is possible to realize the image blur correction apparatus of the moving-coil type which has the concave portions 1q-1 to 1q-3 on the periphery of the base member 1, has a small size but drives the image blur correction lens in a sufficiently large movable range, and has excellent image blur correction characteristics.

In addition, according to Embodiment 1, the space of the drive portion for image blur correction and the movement amount of the lens hold member 5 are sufficiently ensured, and at the same time, the other member (the lens hold frame 30) can be disposed around the optical axis without increasing the diameter of the lens barrel. Since the shaft arrangement portions 1n-1 to 1n-3 can be provided close to the image blur correction lens 14, and the engaging portions 5j-1 to 5j-3 can be provided close to the image blur correction lens 14, an inclination of the lens hold member 5 toward the optical axis can be reduced. In addition, since the support shafts 21a to 21c can be reduced in length, an inclination of the support shafts 21a to 21c is reduced, thereby providing the image blur correction apparatus and the lens barrel (the lens apparatus) with a small size and excellent optical performance.

While the aforementioned description has been made for the case where the present invention is applied to the image blur correction apparatus mounted on the image-taking lens barrel in Embodiment 1, the present invention is applicable to a image blur correction apparatus mounted on a lens barrel of a camera integral with a lens or an observation device such as binoculars.

While preferred embodiments have been described, it is to be understood that modification and variation of the present invention may be made without departing from the scope of the following claims.

"This application claims priority from Japanese Patent Application No. 2004-33280 filed on Feb. 10, 2004, which is hereby incorporated by reference herein."

What is claimed is:

1. An image blur correction apparatus comprising:
a base member which is moved in a direction of an optical axis with respect to a member extended in the direction of the optical axis; and
a lens hold member which is moved in a plane substantially orthogonal to the optical axis with respect to the base member,
wherein the base member has a concave portion on a periphery thereof through which the member extended in the direction of the optical axis passes and is provided with a support shaft closer to the optical axis than the concave portion, the support shaft supporting the lens hold member,
the lens hold member has an engaging portion which engages with the support shaft to allow a movement of the lens hold member in the plane substantially orthogonal to the optical axis,
the support shaft may slide freely through the engaging portion, and
the base member has a shaft arrangement portion which is provided with the support shaft, and the engaging portion has a width larger than a width of the shaft arrangement portion closer to the engaging portion in the plane orthogonal to the optical axis.

2. The image blur correction apparatus according to claim 1, wherein the base member has a magnet and the lens hold member has a coil, and
the lens hold member is moved in the plane substantially orthogonal to the optical axis by the magnet and the coil.

3. The image blur correction apparatus according to claim 2, wherein a first coil which drives the lens hold member in a first direction orthogonal to the optical axis and a second coil which drives the lens hold member in a second direction orthogonal the first direction are attached to the lens hold member, and
the support shaft and the engaging portion are provided in an area between the first coil and the second coil.

4. The image blur correction apparatus according to claim 2, wherein the coil has a convex shape, and a portion of the base member closer to the coil has a concave shape recessed from the coil which is moved closer to the portion.

5. An optical device comprising: the image blur correction apparatus according to claim 1; and
an image-taking optical system which includes the image blur correction apparatus.

6. A lens apparatus comprising:
a barrel member which has a member extended in a direction of an optical axis;
a base member which has a concave portion on a periphery thereof through which the member extended in the direction of the optical axis passes, the base member is moved in the direction of the optical axis with respect to the barrel member, and a lens hold member which is moved in a plane substantially orthogonal to the optical axis with respect to the base member, wherein the base member is provided with a support shaft closer to the optical axis than the concave portion, the support shaft supporting the lens hold member, the lens hold member has an engaging portion which engages with the support shaft to allow a movement of the lens hold member in the plane substantially orthogonal to the optical axis, the support shaft may slide freely through the engaging portion, and the base member has a shaft arrangement portion which is provided with the support shaft, and the engaging portion has a width larger than a width of the shaft arrangement portion closer to the engaging portion in the plane orthogonal to the optical axis.

7. The lens apparatus according to claim 4, wherein a driving portion which moves the lens hold member with respect to the base member is disposed a position different from the concave portion in a circumferential direction centered the optical axis.

8. An image blur correction apparatus comprising:

a base member which is moved in a direction of an optical axis with respect to a member extended in the direction of the optical axis; and a lens hold member which is moved in a plane substantially orthogonal to the optical axis with respect to the base member, wherein the base member has a concave portion on a periphery thereof through which the member extended in the direction of the optical axis passes and is provided with a support shaft closer to the optical axis than the concave portion, the support shaft supporting the lens hold member, the lens hold member has an engaging portion which engages with the support shaft to allow a movement of the lens hold member in the plane substantially orthogonal to the optical axis, the support shaft may slide freely through the engaging portion, the base member has a magnet and the lens hold member has a coil, the lens hold member is moved in the plane substantially orthogonal to the optical axis by the magnet and the coil, and the coil has a convex shape, and a portion of the base member closer to the coil has a concave shape recessed from the coil which is moved closer to the portion.

9. An optical device comprising: the image blur correction apparatus according to claim 8; and an image-taking optical system which includes the image blur correction apparatus.

* * * * *

UNITED STATES PATENT AND TRADEMARK OFFICE
CERTIFICATE OF CORRECTION

| | | |
|---|---|---|
| PATENT NO. | : 7,450,153 B2 | Page 1 of 1 |
| APPLICATION NO. | : 11/053283 | |
| DATED | : November 11, 2008 | |
| INVENTOR(S) | : Hiroshi Akada | |

It is certified that error appears in the above-identified patent and that said Letters Patent is hereby corrected as shown below:

IN THE CLAIMS:

Column 15, Claim 7, line 20, "claim 4" should read --claim 6--.

Signed and Sealed this

Third Day of February, 2009

JOHN DOLL
*Acting Director of the United States Patent and Trademark Office*